(12) United States Patent
Aue et al.

(10) Patent No.: US 11,668,418 B2
(45) Date of Patent: *Jun. 6, 2023

(54) CONNECTION DEVICE

(71) Applicant: Sartorius Stedim Biotech GmbH, Göttingen (DE)

(72) Inventors: Norbert Aue, Bovenden (DE); Sebastian Handt, Göttingen (DE); Sebastian Purmann, Göttingen (DE); Volker Limpert, Morschen (DE)

(73) Assignee: Sartorius Stedim Biotech GmbH, Göttingen (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/469,865

(22) Filed: Sep. 8, 2021

(65) Prior Publication Data
US 2021/0404581 A1 Dec. 30, 2021

Related U.S. Application Data

(63) Continuation of application No. 16/089,952, filed as application No. PCT/EP2017/058694 on Apr. 11, 2017, now Pat. No. 11,193,613.

(30) Foreign Application Priority Data

Apr. 18, 2016 (DE) ...................... 10 2016 107 159.5

(51) Int. Cl.
*F16L 23/08* (2006.01)
*F16L 37/113* (2006.01)
(Continued)

(52) U.S. Cl.
CPC ............. *F16L 23/08* (2013.01); *F16L 37/113* (2013.01); *F16L 21/06* (2013.01); *F16L 21/08* (2013.01);
(Continued)

(58) Field of Classification Search
CPC . F16L 23/04; F16L 23/08; F16L 23/10; F16L 21/06
See application file for complete search history.

(56) References Cited

U.S. PATENT DOCUMENTS 2,413,402 A 12/1946 Becker
3,709,526 A 1/1973 Cromie
(Continued)

FOREIGN PATENT DOCUMENTS

CN 105387298 A 3/2016
CN 105423024 A 3/2016
(Continued)

OTHER PUBLICATIONS

International Search Report of PCT Application No. PCT/EP2017/058694, dated Jun. 27, 2017.
(Continued)

*Primary Examiner* — Zachary T Dragicevich
*Assistant Examiner* — Alexander T Rufrano
(74) *Attorney, Agent, or Firm* — Pearl Cohen Zedek Latzer Baratz LLP

(57) ABSTRACT

A connection device has a line portion having, at its end, a radially outwardly projecting abutment flange for abutting against a corresponding abutment flange of a further line portion which is to be coupled to the line portion, and a ring-segment chain comprising a plurality of ring segments connected to one another in a pivotable manner in a common ring plane, wherein the ring-segment ends which form the chain ends can be latched to one another to give a ring-form connection clamp. The line portion is designed in the form of a tubular connection stub with first thread means spaced apart axially from the abutment surface of its abutment flange and in that each ring segment has a radially inwardly projecting clamping flange and second thread means, which
(Continued)

are spaced apart axially from said clamping flange and correspond to the first thread means.

8 Claims, 5 Drawing Sheets

(51) Int. Cl.
*F16L 21/06* (2006.01)
*F16L 21/08* (2006.01)

(52) U.S. Cl.
CPC ....... *F16L 2201/10* (2013.01); *F16L 2201/20* (2013.01)

(56) References Cited

U.S. PATENT DOCUMENTS

| | | | |
|---|---|---|---|
| 4,570,673 A * | 2/1986 | Kendrick | F16L 23/04 285/302 |
| 5,667,251 A | 9/1997 | Prest | |
| 6,840,782 B1 * | 1/2005 | Borden | H01R 4/643 439/92 |
| 7,596,884 B2 | 10/2009 | Kim | |
| 8,322,368 B2 * | 12/2012 | Zenz | F16L 55/1018 137/614.05 |
| 8,328,457 B2 | 12/2012 | Werth | |
| 8,740,254 B2 | 6/2014 | Mason | |
| 8,936,207 B2 * | 1/2015 | Swan | B05B 15/40 239/589 |
| 9,012,791 B2 | 4/2015 | Smith | |
| 9,605,782 B2 | 3/2017 | Werth | |
| 10,027,039 B1 * | 7/2018 | Smith | H01R 4/38 |
| 2002/0093199 A1 * | 7/2002 | Le | F16L 37/248 285/420 |
| 2006/0022465 A1 | 2/2006 | Yamauchi | |
| 2010/0253075 A1 | 10/2010 | Werth | |
| 2013/0078033 A1 | 3/2013 | Werth | |
| 2013/0089994 A1 | 4/2013 | Smith | |
| 2015/0053476 A1 | 2/2015 | Smith | |
| 2016/0053926 A1 | 2/2016 | Whitaker | |
| 2017/0001516 A1 | 1/2017 | Beck | |
| 2019/0128456 A1 * | 5/2019 | Aue | F16L 47/14 |

FOREIGN PATENT DOCUMENTS

| | | | | |
|---|---|---|---|---|
| FR | 2 895 057 A1 | 6/2007 | | |
| FR | 2895057 A1 * | 6/2007 | ............ | F16L 35/005 |
| JP | 2010/255701 A | 11/2010 | | |
| WO | WO-0235130 A2 * | 5/2002 | ............ | F16L 37/248 |
| WO | WO 2017/149104 A1 | 9/2017 | | |

OTHER PUBLICATIONS

Office Action for U.S. Appl. No. 16/069,952, dated Jan. 14, 2021.
Final Office Action for U.S. Appl. No. 16/069,952, dated Jun. 30, 2021.
Office Action for German Patent Application No. 10 2016 015853.0, dated Aug. 11, 2022.

* cited by examiner

CONNECTION DEVICE

CROSS-REFERENCE TO RELATED APPLICATIONS

This application is a continuation of U.S. patent application Ser. No. 16/089,952, filed Sep. 28, 2018 as a National Phase Application of PCT International Application No. PCT/EP2017/058694, International Filing Date Apr. 11, 2017, claiming priority of German Patent Application No. 10 2016 107 159.5, filed Apr. 18, 2016, which is hereby incorporated by reference.

FIELD OF THE INVENTION

The invention relates to a connection device comprising
a line portion having, at its end, a radially outwardly projecting abutment flange for butting against a corresponding abutment flange of a further line portion which is to be coupled to the line portion, and
a ring-segment chain comprising a plurality of ring segments connected to one another in a pivotable manner in a common ring plane, wherein the ring-segment ends which form the chain ends can be latched to one another to give a ring-form connection clamp.

BACKGROUND OF THE INVENTION

Connection devices of this type are known from U.S. Pat. No. 8,328,457 B2.

For connecting line portions, e.g. portions of hoses or pipes amongst or with each other, so-called Tri-Clamps (synonyms: Tri-Clover fitting, Sanitary fitting) are known as standardized connection clamps. A Tri-Clamp is defined as a pivotable connection clamp with two clamping flanges spaced apart axially that are arranged slightly tilted towards each other, so that between them a radially inwards widening wedge-shaped ring space is formed. Such a clamp is suited for connecting two line portions, each of which having at its end a radially outwardly projecting abutment flange, and making contact with each other through their respective abutment surfaces. The clamp is folded around the contacting abutment flanges so that the clamping flanges make contact with the rearward faces of the abutment flanges. The force exerted by the folding of the clamp is transformed by the sloped surfaces of the clamping flanges into an axial force, which operates as a compressing force on the butting abutment surfaces of the abutment flanges. To hold the clamp in a folded-shut state, its free ends can be connected to each other. From the above-mentioned document defining the generic type, a locking mechanism is known for the free ends of the ring segments of the clamp that are connected to each other in a pivotable manner.

A disadvantage is that the compression force between the line portions depends directly on the manual strength of the fitter with which he presses the free ends of the ring segments against each other. This manual strength can be enhanced by the use of tools; however, this complicates and slows down the installation process.

From the above-mentioned document a clamp constituted as two semicircular ring segments is known. However, clamps formed from more than two ring segments are known as well. In each case, in its open state the clamp forms a ring-segment chain with a plurality of ring segments that are connected to each other in a pivotable manner. Upon pivoting, the ring elements move relative to each other in a ring plane that corresponds in the folded-shut state to the ring plane of the resulting ring-form connection clamp.

From US 2010/0253075 A1 a non-pivotable, bell-shaped connection clamp is known. The bell crown forms a first clamping flange; at the bell edge a radially inwardly projecting, second clamping flange is provided. Due to vertical slits in the bell wall, the bell edge and with it the second clamping flange can be widened elastically. Thus the bell can be slipped axially over the mutually butting abutment flanges of two line portions and holds these together in a form-fitting manner. To increase the compression force, a nut is screwed onto an outside thread of the bell, thus compressing the bell edge, and with it the second clamping flange, radially inward. Due to a relatively inclined position between the first clamping flange (bell crown) and the second clamping flange (bell edge), an axial compression force acting on the abutment flanges is generated.

From U.S. Pat. No. 9,012,791 B1 a pivotable pipe-end bushing is known. It is meant to protect sleeves of cables guided through a guiding pipe against damage from sharp burrs at the end of the pipe. It consists of a screw cap with a large central opening, the edge of which is just wide enough to project radially inward over the sharp burrs on the inner edge of the pipe. To enable its mounting even with cables already laid through the guiding pipe, the bushing is made up of two ring segments connected in a pivotable manner in a common ring plane, with their free ends being lockable to each other.

The objective of the present invention is to further develop a connection device of the generic type such that, without the need for additional tools or for screw nuts and tension bolts as locking devices as used in conventional Tri-Clamp connections, an increased compression force on the abutment flanges of the line portions to be coupled together is enabled. In particular, it is the objective of the invention to accomplish this without modification of the additional (second) line portion, which is not a part of the invention itself and which is to be coupled to the first line portion.

SUMMARY OF THE INVENTION

This problem is solved in connection with the features of the preamble of the independent claims in that the line portion is designed in the form of a tubular connection stub with first thread means spaced apart axially from the abutment surface of its abutment flange and in that each ring segment has a radially inwardly projecting clamping flange and second thread means, which are spaced apart axially from said clamping flange and correspond to the first thread means.

The dependent claims relate to preferred embodiments of the invention.

A first aspect of the present invention is to modify the first line portion compared with the Tri-Clamp standard, in particular to add first thread means that are arranged spaced apart axially from the abutment surface of its abutment flange. On the specific design of the thread means, various exemplary embodiments will be presented further below.

A second aspect of the present invention is also to modify the connection clamp in a specific way compared with the Tri-Clamp standard, in particular by applying second thread means in place of a second clamping flange, which second thread means interact with the first thread means to form a single thread.

As is known from the Tri-Clamp principle explained above, first the connection clamp is folded around the butting abutment flanges of the line portion and of the additional line portion, with the clamping flange butting the rear face of the abutment flange of the additional line portion and the first and second thread means interlocking to form a single thread. As an option at this point a suitable arrangement of flange slopes similar to the Tri-Clamp principle explained above can generate a preliminary compression force on the butting abutment flanges. A subsequent rotation of the closed connection clamp relative to the connection stub then causes an axial motion of the closed connection clamp, due to the interaction between the first and second thread means, and thereby generates an additional axial force, which increases the compression force acting on the abutment flanges or sealing faces respectively. The required torque to be applied manually in this case can be adjusted to the circumstances of the specific application by selecting the thread pitch and the diameter of the connection clamp. This way, the required compression force for a tight connection can be obtained with a lower manually applied torque compared to the conventional Tri-Clamp standard.

In a first preferred embodiment of the invention it is provided that the first thread means are designed as a plurality of ramp sections distributed around the circumference of the connection stub, and corresponding to the number of ring segments, the sloped surfaces of which ramp sections are arranged on the sides of the latter facing away from the abutment flange, and the second thread means are designed as an equal plurality of ramp sections correspondingly distributed around the circumference of the (closed) connection clamp, the sloped surfaces of which are arranged on the sides of the ramp sections facing towards the clamping flange. In other words, a screw configuration is realized with a number of threads corresponding to the number of ring segments, wherein however each thread extends only over a fraction 1/N of a full turn, with N being the number of ring segments. In a connection clamp made up from two ring segments, this thus leads to a screw configuration with two threads, wherein each thread extends over the length of half a turn. The threads do not overlap each other. Therefore, the connection clamp may be turned at most by a fraction 1/N of a full turn. The advantage of an embodiment with N=2 ring segments is derived from the enlargement of the abutment surface between the first and second thread means, which in the tensioned state butt against each other over nearly 50% of the circumference, while they have no contact over the remaining 50% of the full circumference. In an additional embodiment, in the tensioned state, the abutment surface can be maximized by a single continuous first thread means. Hereby, even if only slightly deformable plastic material is used, any deformations that may possibly lead to lack of sealing are avoided.

In particular when using essentially undeformable materials, a material-saving and weight-saving second variant may be advantageous, in which the first thread means are constituted as a plurality of local locking protrusions, distributed around the circumference of the connection stub and extending radially outward, and the second thread means are constituted as an equal plurality of slanted slits in the walls of the ring segments correspondingly distributed around the circumference of the connection clamp. This corresponds to the principle of the BNC connectors known from the field of electronics ("Bayonet Neill-Concelman" connector).

In order to avoid unintended unlocking of a connection of two line portions, after the connection has been tightened according to the invention, it may be provided in a further development of the invention that the connection stub has radially outward acting first locking means and one of the ring segments has corresponding, radially inward acting second locking means, which interact to prevent a rotation of the connection clamp relative to the connection stub in the unlocking direction. The first and second locking means are preferably arranged relative to each other in the circumferential direction so that they engage each other only in the tensioned state of the connection device. In this way, the fitter, who perceives the locking action for example through a locking sound, a locking click or a mechanical stop, receives feedback about whether he has already tensioned the thread sufficiently by turning the connection clamp in the tensioning direction.

The second locking means are arranged preferably axially between the clamping flange and the interacting surface of the second thread means. It follows from this that the corresponding first locking means in this embodiment are arranged axially between the abutment surface of the abutment flange and the interacting surface of the first thread means. In the preferred embodiment of the invention the abutment flange and the first thread means, both of which protrude radially outward over the wall of the connection stub, are spaced apart axially from each other. In this gap the first locking means may be placed. The corresponding connection clamp includes a gap between the clamping flange and the second thread means, which are similarly spaced apart axially from each other and protrude radially inward. In this gap the second locking means are placed, thus saving space. The second locking means may also be arranged in or on a support structure of the first thread means. On the other hand, embodiments may also be considered where the rear face of the abutment flange at the same time supports the first thread means. In this case a suitable gap for placing the first locking means between the abutment flange and the first thread means is missing.

Independent of the specific positioning of the second locking means a preferred embodiment of the invention provides that the second locking means are designed as a manually releasable latching rocker. Hereby, the first and second locking means interacting with each other can prevent an unintentional release of the connection made according to the invention, but at the same time it is possible if necessary to release the connection intentionally. A person skilled in the art will be able to decide, based on the needs of the specific case, whether a releasable or non-releasable connection should be implemented. For example, in a releasable connection the latching rocker may be equipped with an actuation section.

A person skilled in the art will have recognized within the framework of the above explanations that closing of the connection clamp around the abutment flanges of the line portions is not possible in all angular positions of the connection clamp relative to the connection stub. Instead, typically this will be possible only in one angular position, from which a rotation in the tensioning direction is possible. To make it easier to locate this starting position, it is provided in a preferred extension of the invention that the connection stub be equipped with a radially outward protruding first rotational stop and that one of the ring segments has a corresponding second rotational stop. Of course, the rotational stops are to be positioned such that upon making contact with each other they define the starting position described above. In such an embodiment, with the connection clamp in its opened state, the ring segment carrying the second rotational stop can be brought into contact with its second rotational stop against the first rotational stop. In this alignment, closing of the connection clamp and interlocking of its free ends is possible without any problem. In addition, the rotational stops prevent any inadvertent rotation in the release direction. Only a rotation in the tensioning direction is possible and may be terminated preferably after engagement of the first and second locking means with each other.

In a specific design of the rotational stops it may be provided that one of the rotational stops is configured as a slotted bracket with a locking slot tangentially open to one side and the second rotational stop takes the form of an axially extending corresponding locking pin. By implementing the rotational stops as locking elements interacting with each other, prepositioning of the still open connection clamp on the connection stub becomes possible. The locking pin, which preferably is mounted on one of the ring segments, may have a free end with a pin head attached, which is wider than the width of the locking slot. This design prevents the prepositioned still open connection clamp from becoming detached in the direction of rotation (locking slot) and in the axial direction (pin head). In an additional embodiment the locking pin may be designed as a dual-head pin head.

Such captive prepositioning of the still open connection clamp on the connection stub has proven particularly advantageous in the preferred application mode of the invention. In this way it is namely provided that said connection stub is part of a container, e.g. of a bioreactor, or part of a filter capsule or of a piping system, which the manufacturer of the container or capsule supplies to the user together with a prepositioned still open connection clamp. The user, for his part, can connect hoses or pipes that are configured according to the conventional Tri-Clamp standard and equipped with the corresponding abutment flanges, as well as the necessary seals, and thereby, without modification to his own equipment, use the advantageous connection technology according to the invention and as specified by the container manufacturer.

Additional features and advantages of the invention are evident from the following special description and the drawings.

BRIEF DESCRIPTION OF THE DRAWINGS

The figures show.

DETAILED DESCRIPTION OF THE INVENTION

Identical reference numbers in the figures refer to identical or analogous elements.

Figure 1:
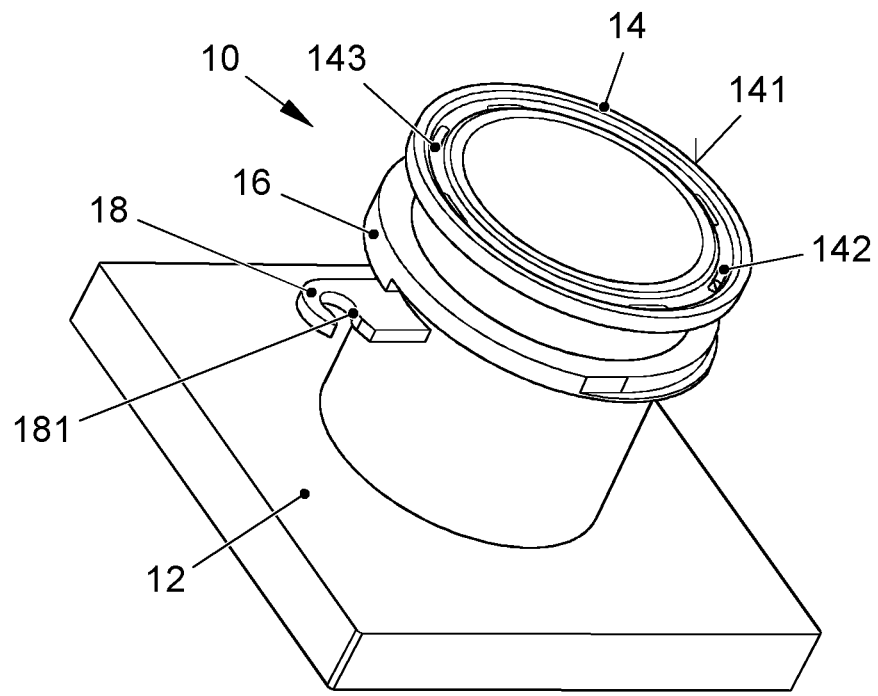
FIG. 1: a connection stub according to the invention in a first view.
Figure 2:
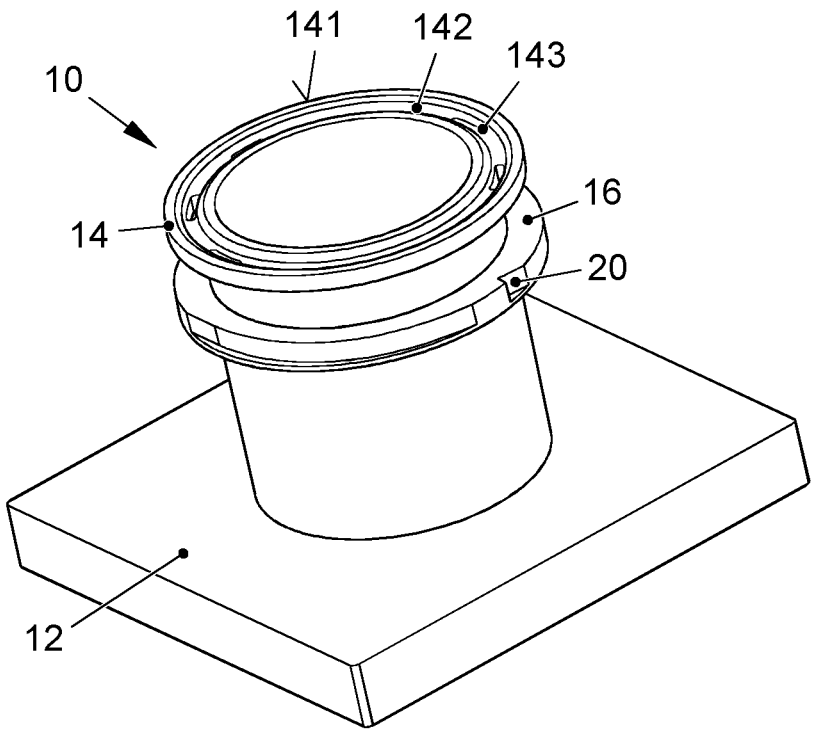
FIG. 2: the connection stub of FIG. 1 in a second view.

The FIGS. 1 and 2 show a connection stub 10 in a preferred embodiment of the present invention. The connection stub 10 is firmly attached to the wall 12 of an otherwise not displayed container, e.g. a bioreactor or piping system, or for example on a filter capsule. Preferably the connection stub 10 is formed in a single piece with the container, piping or capsule wall 12. The connection stub 10 has at its free end a radially outwardly projecting abutment flange 14. This abutment flange 14 serves to butt against a corresponding abutment flange of a further line portion (not displayed), e.g. of a hose or pipe, which can be connected in a leakproof manner to the container or capsule. In the embodiment shown the abutment surface 141 of the abutment flange 14 possesses a sealing groove 142, into which a preferably elastic seal can be inserted. The sealing groove 142 may include locking openings 143, which allow to anchor the seal so that the seal does not slip during joining of the flanges. The aforementioned locking openings may also be used as auxiliary means for the two-component injection molding of the connection and the seal.

At an axial distance from the abutment flange 14 a ramp ring 16 encircles the connection stub 10. The ramp ring 16 consists of two ramp sections, which are offset from each other by 180° and reach about halfway each around the circumference of the connection stub 10. The slopes of the ramp sections are located on the side of the ramp ring 16 oriented away from the abutment flange 14, i.e. downwards in FIG. 1. This is easily recognizable particularly in FIG. 1, where on the left an edge between the two ramp sections is visible.

A person skilled in the art will recognize that within the framework of the invention the axial gap between the abutment flange 14 and the ramp ring 16 shown in FIGS. 1 and 2 is not obligatory. Rather, it is also possible to position the ramp ring 16 in direct contact with the rear shoulder of the abutment flange 14, which through shortening and geometric simplification of the construction leads to an improved stability and sealing effect.

Furthermore, in FIG. 1 a slotted bracket 18 is recognizable, which protrudes below the ramp ring 16 radially outward from the wall of the connection stub 10 and includes a locking slot 181 tangentially open to one side, the purpose of which will be discussed in more detail further below.

In FIG. 2 a locking notch 20 is recognizable in the area of the ramp ring 16. The purpose of this locking notch 20 will also be discussed in more detail further below.

Figure 3:
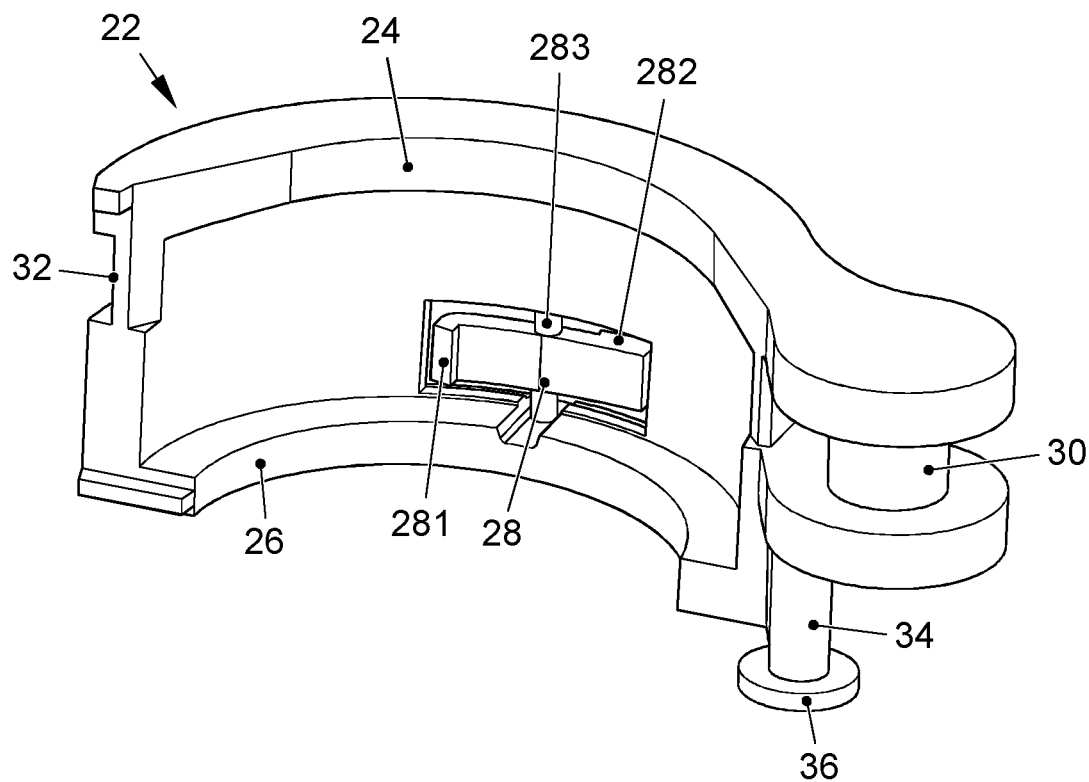
FIG. 3: a first ring segment of a connection clamp according to the invention.
Figure 4:
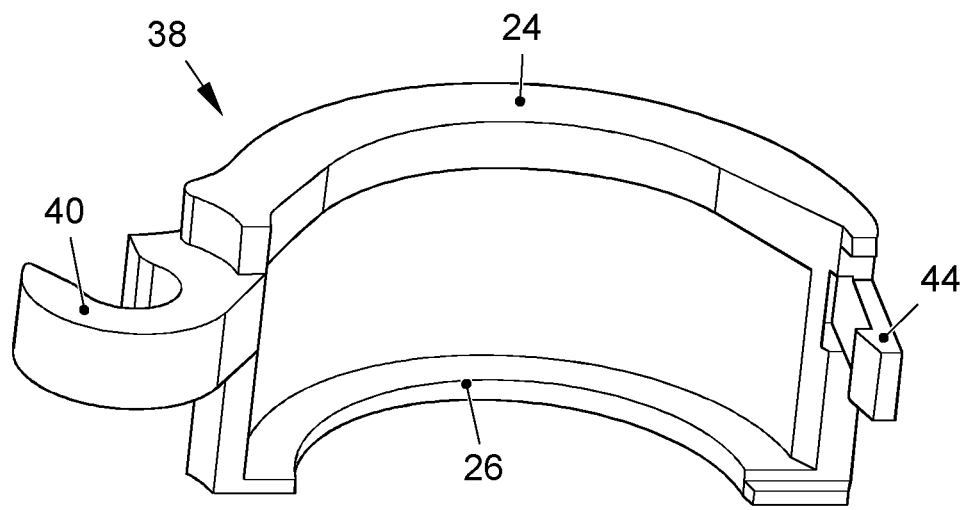
FIG. 4: a second ring segment of the connection clamp according to the invention.

The FIGS. 3 and 4 each show a ring segment from which a connection clamp according to the invention may be constructed. The ring segment 22 of FIG. 3 extends over an arc of about 180°. At its (in FIG. 3) upper edge it has a radially inwardly projecting clamping flange 24. Spaced apart axially from this, i.e., at the opposite edge of the ring element 22, there extends a ramp section 26 having the ramp slope on the side facing the clamping flange 24. The ramp slope of the ramp section 26 of the ring element 22 corresponds to the ramp slope of the ramp sections of the ramp ring 16 of the connection stub 10.

In the axial gap between the clamping flange 24 and the ramp section 26, a latching rocker 28 is incorporated, which reaches through the wall of the ring segment 22. A radially inward elastically pretensioned hook-shaped section 281 protrudes into the curvature of the ring segment 22. Located on the other end of the latching rocker 28, an actuation part 282 on the other hand protrudes radially outward from the ring segment 22. The latching rocker 28 is mounted pivotably about an axis 283. Exerting pressure from radially outside onto the actuation part 282 causes the hook-shaped section 281 to pivot outward.

On the right in FIG. 3, a pivot axis 30 can be seen arranged on the ring segment 22, the purpose of which will be explained below in connection with FIG. 4.

On the left in FIG. 3, a locking notch 32 can be seen, the purpose of which will also be explained below in connection with FIG. 4.

Finally, in FIG. 3 a locking pin 34 can be seen, which is attached to the ring segment 22 below the pivot axis 30 and which on its free end has a pin head 36 with a wider diameter. Positioning and dimensioning of the locking pin 34 are chosen such that the locking pin 34 can engage in the locking slot 181 of the slotted bracket 18 of the connection stub 10, with the diameter of the pin head 36 being chosen to be larger than the width of the locking slot 181. The functional purpose of these elements will be discussed in more detail further below.

Figure 5:
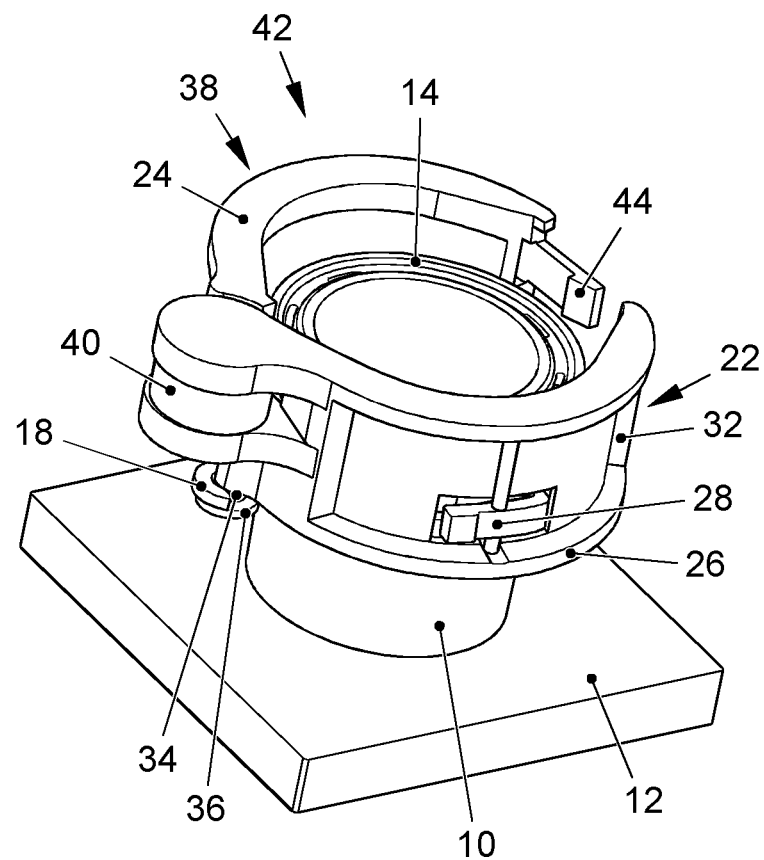
FIG. 5: the connection stub of FIGS. 1 and 2 with a pre-mounted connection clamp in the open state, consisting of the ring segments of FIGS. 3 and 4,
FIG. 6: the connection stub and connection clamp of FIG. 5 in the closed state in the release position.
Figure 6:
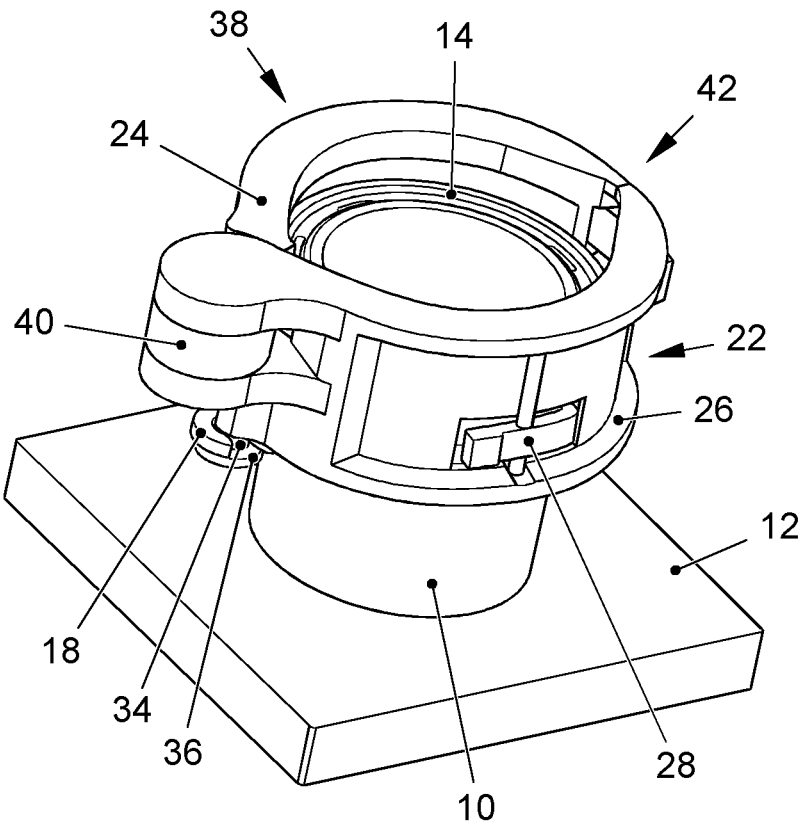
Figure 7:
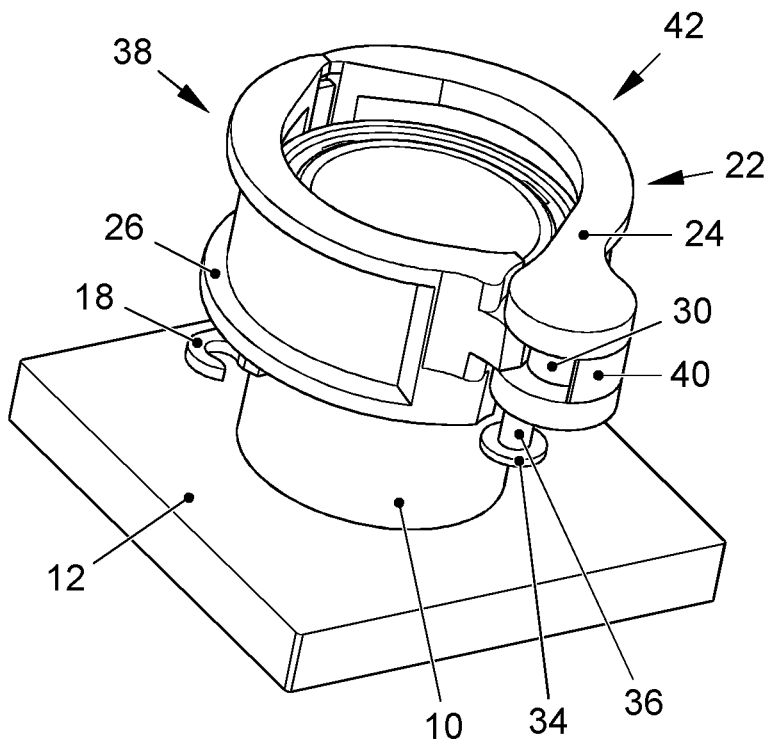
FIG. 7: the connection stub and connection clamp of FIG. 6 in the tensioned position.

FIG. 4 shows a further ring segment 38, which can be connected with the previously described ring segment 22 in a pivotable manner. For this purpose, a locking hook 40 is provided on the left in FIG. 4 said hook being able to engage around the pivot axis 30 with a locking action. The ring element 22 and the further ring element 38 are then connected pivotably around the pivot axis 30, i.e. in a ring plane oriented perpendicularly to the pivot axis 30. As the further ring element 38 also extends over an arc length of about 180°, the ring element chain thus formed can be closed by folding it together to create a ring-form connection clamp 42, as shown in FIGS. 5-7. To also fix the ring elements 22, 38 to each other at their free ends in the closed state, the further ring element 38 has, at an end on the right in FIG. 4, a locking hook 44 that can engage in a locking manner with the locking notch 32 of the ring segment 22 in FIG. 3.

In addition, the further ring element 38 also includes, as seen in FIG. 4, an upper clamping flange 24 and, as seen in FIG. 4, a lower ramp section 26. Regarding these elements, the explanations for the corresponding elements of the ring segments 22 in FIG. 3 may be referred to. However, it should be noted that the clamping flanges 24 of the ring segments 22, 38 are designed such that their axially inner, i.e. their lower edges in FIGS. 3 and 4, are flush extensions of each other. The ramp sections 26, on the other hand, are designed such that they correspond to two screw threads, offset by 180° and each 180° long.

FIG. 5 shows a connection clamp 42 made up of the ring segments 22, 38 of FIGS. 3 and 4, said clamp being pre-fixed in a still-open state on a connection stub 10 of FIGS. 1 and 2. For pre-fixing purposes, the locking pin 34 of the ring segment 22 is engaged in the locking slot 181 of the connection stub 10. The pin head 36 prevents an axial detachment. The opened connection clamp 22, or the ring-segment chain made up of the ring segments 22, 38 is thereby undetachably pre-fixed on the connection stub 10. In this state preferably containers, line systems or filter capsules can be delivered with a connection device according to the invention so that customers may independently connect their own lines, which are designed according to the conventional Tri-Clamp standard, and make use of the advantages according to the invention.

FIG. 6 shows the ensemble of FIG. 5, however with a closed connection clamp 42. For this purpose the locking hook 44 and the locking notch 32 on the up to then free ends of the ring segments 22, 38 are locked to each other. A person skilled in the art will however understand that this description is meant only to illustrate the principle and represents one of multiple possible scenarios. In practice, before closing the connection clamp 42, a further line portion with its abutment flange, which is to be connected to the connection stub 10, together with the corresponding seal, are placed on the abutment surface 141 of the abutment flange 14 of the connection stub 10 so that the clamping flange 24 of the connection clamp 42 rests on the rear shoulder of the abutment flange of the line portion to be coupled up. This corresponds to the known Tri-Clamp principle. Sloped surfaces of the clamping flange 24 and/or of the rear shoulder of the abutment flange of the line portion to be coupled up generate thereby a precompression of the abutment flanges to be coupled.

FIG. 7 shows the final position of the clamping device according to the invention, where the connection clamp 42 is rotated by a quarter turn (in FIG. 7 in the counter-clockwise direction) relative to the connection stub 10. Through the thread-like interaction of the ramp sections 26 of the connection clamp 42 with the ramp sections of the ramp ring 16 of the connection stub 10 this leads to an axial shift of the connection clamp 42 in the direction towards the container or capsule wall 12. Hereby, the rear shoulder of the abutment flange of the line portion to be coupled up, behind which shoulder the clamping flange 24 of the connection clamp 42 engages, is pulled onto the abutment surface 141 of the abutment flange 14 of the connection stub 10, which leads to a sealing compression of the two abutment flanges.

It cannot be seen in FIG. 7 that in the displayed embodiment the locking hook 281 of the latching rocker 28 is positioned exactly in the area of the locking notch 20 on the connection stub 10 and engages there. In this way a subsequent rotation in the release direction (i.e. in the clockwise direction for the embodiment shown) is prevented. However, to obtain the option of an intentional release of the coupling, the interlocking of the hook-shaped section 281 and the locking notch 20 can be released by manually pressing on the actuation part 282 of the latching rocker 28.

Figure 8:
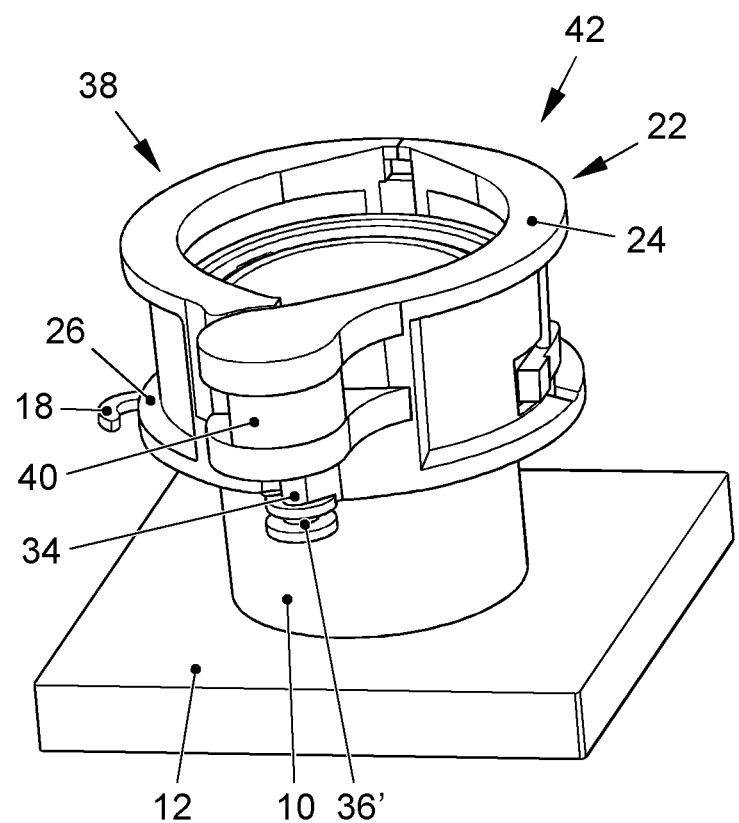
FIG. 8: the connection stub of FIG. 1 with modified connection clamp in the tensioned position.

FIG. 8 shows the constellation of FIG. 7 with a slightly modified connection clamp 42. The locking pin 34 here has a dual pin head 36'. In this embodiment the locking slot 181 of the slotted bracket 18 can engage between the single disks of the dual pin head 36' and thereby ensure a precise axial fixation.

Of course, the embodiments discussed in the specific description and shown in the figures are merely illustrative exemplary embodiments of the present invention. In the light of the present disclosure, a person skilled in the art has available a broad spectrum of optional variations. A person skilled in the art will understand that basing the design on the Tri-Clamp standard repeatedly referred to here is not at all obligatory. Due to the widespread use of this standard a corresponding design is however considered particularly advantageous. Adaptations to specific variants of the standard (e.g. Sanitary ¾", Sanitary 1½", and others) are thereby just as possible as adaptations to other standards.

REFERENCE LIST 10 connection stub
12 container wall
14 abutment flange
141 abutment surface
142 sealing groove
143 locking opening
16 ramp ring
18 slotted bracket
181 locking slot
20 locking notch
22 ring segment
24 clamping flange 26 ramp section
28 latching rocker
281 hook-shaped section
282 actuation part
283 rocking axis
30 pivot axis
34 locking pin
36, 36' pin head
38 further ring segment
40 locking hook
42 connection clamp
44 locking hook

The invention claimed is:

1. A connection device comprising
   a first line portion having, at an end, a radially outwardly projecting abutment flange for butting against a corresponding abutment flange of a further line portion which is to be coupled to the first line portion, and
   a ring-segment chain comprising a plurality of ring segments connected to one another in a pivotable manner in a common ring plane, wherein ring-segment ends which form the chain ends can be latched to one another to give a ring-form connection clamp,
   wherein the line portion is designed in the form of a tubular connection stub with a first thread spaced apart axially from an abutment surface of its abutment flange,
   wherein each ring segment has a radially inwardly projecting clamping flange and a second thread, which are spaced apart axially from said clamping flange and correspond to the first thread, and
   wherein the connection stub has a first locking means that act in a radially outward direction, and one of the ring segments has a corresponding second locking means that act in a radially inward direction, which, when engaged, prevent a rotation of the connection clamp relative to the connection stub in an unlocking direction.

2. The connection device according to claim 1, wherein the second locking means are arranged axially between the clamping flange and the interacting surface of the second thread.

3. The connection device according to claim 1, wherein the second locking means are constituted as a manually releasable latching rocker.

4. The connection device according to claim 1,
   wherein the first thread is constituted as a plurality of ramp sections corresponding to the number of ring segments and distributed over a circumference of the connection stub, with their slopes being arranged on their sides facing away from the abutment flange, and
   wherein the second thread is constituted as an equal plurality of corresponding ramp sections distributed over a circumference of the connection clamp, with their slopes being arranged on their sides facing the clamping flange.

5. The connection device according to claim 1, wherein the connection stub has a radially outward protruding first rotational stop, and wherein one of the ring segments has a corresponding second rotational stop.

6. The connection device according to claim 5, wherein one of the rotational stops is constituted as a slotted bracket with a locking slot open tangentially to one side, and wherein the second of the rotational stops is constituted as an axially extending corresponding locking pin.

7. The connection device according to claim 6, wherein the locking pin has a free end where a pin head that is wider than the width of the locking slot is placed.

8. The connection device according to claim 6, wherein the locking pin is fixed to one of the ring segments.

* * * * *